(12) United States Patent
Haltmayer et al.

(10) Patent No.: US 10,897,616 B2
(45) Date of Patent: *Jan. 19, 2021

(54) DYNAMIC ALLOCATION OF CPU CYCLES VIS-A-VIS VIRTUAL MACHINES IN VIDEO STREAM PROCESSING

(71) Applicant: Harmonic, Inc., San Jose, CA (US)

(72) Inventors: Neven Haltmayer, Sunnyvale, CA (US); Eric Le Bars, Geveze (FR); Arnaud Mahe, Poligne (FR); Christophe Berthelot, Erce-pres-Liffre (FR); David Henry, Dourdan (FR); Jeremy Rosenberg, Huntingdon Valley, PA (US)

(73) Assignee: Harmonic, Inc., San Jose, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/160,918

(22) Filed: Oct. 15, 2018

(65) Prior Publication Data

US 2019/0052880 A1 Feb. 14, 2019

Related U.S. Application Data

(63) Continuation-in-part of application No. 14/961,239, filed on Dec. 7, 2015, now Pat. No. 10,104,405, and
(Continued)

(51) Int. Cl.
*H04N 19/127* (2014.01)
*H04N 19/146* (2014.01)
(Continued)

(52) U.S. Cl.
CPC ......... *H04N 19/127* (2014.11); *H04N 19/136* (2014.11); *H04N 19/146* (2014.11); *H04N 19/184* (2014.11); *H04N 19/436* (2014.11)

(58) Field of Classification Search
CPC ......... H04N 21/2385; H04N 21/23418; H04N 21/2405; H04N 21/241; H04N 21/6143;
(Continued)

(56) References Cited

U.S. PATENT DOCUMENTS 5,794,036 A 8/1998 Gomi
6,055,270 A * 4/2000 Ozkan ............... H04N 21/2365
375/240.03
(Continued)

*Primary Examiner* — Michael E Teitelbaum
*Assistant Examiner* — Sean N. Haiem
(74) *Attorney, Agent, or Firm* — Brokaw Patent Law PC; Christopher J. Brokaw

(57) ABSTRACT

Approaches for dynamically allocating CPU cycles for use in processing a video stream. Video complexity information for two or more digital video streams actively being processed by one or more video encoders is determined at periodic intervals. Video complexity information describes the complexity of digital video carried by the digital video streams across a bounded number of consecutive digital frames which includes digital frames not yet processed by the one or more video encoders. A determination is made as to whether a number of CPU cycles allocated for processing a particular digital video stream should be adjusted based on the determined video complexity information. The number of CPU cycles allocated for processing the particular digital video stream may be dynamically adjusted by changing an amount of CPU cycles allocated to a virtual machine in which the stream is processed or by processing the stream in a different virtual machine.

20 Claims, 9 Drawing Sheets

Related U.S. Application Data a continuation-in-part of application No. 15/261,921, filed on Sep. 10, 2016, now Pat. No. 10,133,605.

(60) Provisional application No. 62/089,096, filed on Dec. 8, 2014.

(51) Int. Cl.
  *H04N 19/436* (2014.01)
  *H04N 19/184* (2014.01)
  *H04N 19/136* (2014.01)

(58) Field of Classification Search
  CPC ...... H04N 7/01; H04N 7/0806; H04N 19/127; H04N 19/154; H04N 19/172; H04N 19/179; H04N 19/136; H04N 19/146; H04N 19/184; H04N 19/436
  USPC .............. 375/240.16, 240.03, 240.02; 718/1; 709/223, 219, 226; 700/2; 348/14.09; 717/138
  See application file for complete search history.

(56) References Cited

U.S. PATENT DOCUMENTS

| | | | | |
|---|---|---|---|---|
| 2002/0147969 | A1* | 10/2002 | Lethin | G06F 9/45504 717/138 |
| 2003/0007516 | A1* | 1/2003 | Abramov | H04N 21/2365 370/535 |
| 2004/0039455 | A1* | 2/2004 | Donovan | G06F 9/3851 700/2 |
| 2008/0040453 | A1* | 2/2008 | Cohen | H04N 7/16 709/219 |
| 2008/0280623 | A1 | 11/2008 | Danne | |
| 2010/0104017 | A1* | 4/2010 | Faerber | H04N 7/52 375/240.16 |
| 2012/0051420 | A1* | 3/2012 | Chen | H04N 19/172 375/240.02 |
| 2012/0089980 | A1* | 4/2012 | Sharp | G06F 9/45558 718/1 |
| 2012/0236111 | A1* | 9/2012 | Halavy | H04N 7/152 348/14.09 |
| 2013/0080641 | A1* | 3/2013 | Lui | H04L 67/10 709/226 |
| 2013/0160014 | A1 | 6/2013 | Watanabe | |
| 2014/0085480 | A1* | 3/2014 | Saptharishi | G06F 16/71 348/159 |
| 2014/0112384 | A1* | 4/2014 | Van Veldhuisen | H04N 21/23655 375/240.02 |
| 2014/0181285 | A1* | 6/2014 | Stevens | H04L 67/322 709/223 |
| 2014/0282529 | A1* | 9/2014 | Bugenhagen | G06F 9/45533 718/1 |
| 2015/0067019 | A1 | 3/2015 | Balko | |
| 2015/0192979 | A1 | 7/2015 | Ghose | |
| 2015/0254094 | A1* | 9/2015 | Cao | G06F 16/24568 718/1 |
| 2016/0224394 | A1 | 8/2016 | Farhan | |
| 2016/0239322 | A1* | 8/2016 | Watanabe | G06F 9/45558 |

\* cited by examiner

DYNAMIC ALLOCATION OF CPU CYCLES VIS-A-VIS VIRTUAL MACHINES IN VIDEO STREAM PROCESSING

CLAIM OF PRIORITY

This application is a continuation-in-part of, and claims priority to, U.S. patent application Ser. No. 15/261,921, filed Sep. 10, 2016, entitled "Determining a Computer Capacity of one of a Physical or a Virtual Machine," the contents of which are hereby incorporated by reference for all purposes as if fully set forth herein.

U.S. patent application Ser. No. 15/261,921 claims priority to European Patent Application No. EP 15306385.4, filed Sep. 11, 2015, entitled "Method for Determining a Computing Capacity of one of a Physical or a Virtual Machine," the entire disclosure of which is hereby incorporated by reference for all purposes as if fully set forth herein.

This application is also a continuation-in-part of, and claims priority to, U.S. patent application Ser. No. 14/961,239, filed Dec. 7, 2015, entitled "Dynamic Allocation of CPU Cycles in Video Stream Processing," the contents of which are hereby incorporated by reference for all purposes as if fully set forth herein.

U.S. patent application Ser. No. 14/961,239 claims priority to U.S. provisional patent application Ser. No. 62/089,096, filed Dec. 8, 2014, entitled "Dynamic Allocation of CPU Cycles in Video Stream Processing," the contents of which are hereby incorporated by reference for all purposes as if fully set forth herein.

FIELD OF THE INVENTION

Embodiments of the invention relate to optimizing hardware and software resources used by software responsible for processing digital video.

BACKGROUND

A communication satellite's transponder is a series of interconnected units which form a communications channel between receiving and transmitting antennas. Most communication satellites carry dozens of transponders, each transponder having a bandwidth of tens of megahertz. Most transponders operate on a "bent pipe" principle by sending a received signal back to earth with minimal processing, e.g., a transponder might amplify a signal and shift the signal from an uplink frequency to a downlink frequency. Some communication satellites use a "regenerative" transponder whereby a received signal is also demodulated, decoded, re-encoded, and modulated aboard the satellite.

Two or more digital video services (such as a channel) may be supported by a single transponder. As each transponder has a fixed capacity, the determination of how many digital video services that a particular transponder supports is based on maximizing the limited resources of the transponder as best possible. To arrive at the number of digital video services a particular transponder should support, one could simply assign an equal, fixed-sized share of the total capacity of the transponder to each service carried by the transponder. For example, if the transponder is to support five services, then each service would be assigned a fixed 20% of the capacity of the transponder. In this fashion, the transponder could support additional services until the proportional share of the transponder capacity assigned to a particular service is less than the minimum amount of transponder capacity required to support the worst case scenario or high water mark use-case of that service.

In practice, the amount of transponder capacity required by any particular single digital video service fluctuates over time. To make better use of the transponder in view of the changing needs of the services it supports, an approach termed "statistical multiplexing" has been used to allocate transponder resources to digital video services. In statistical multiplexing, the capacity of the transponder is dynamically adjusted many times a second based on the complexity of the digital video carried by each channel supported by the transponder. The complexity of the digital video is a measure of how much data it takes to describe how to display the digital video. In this way, when a particular channel requires a larger portion of the transponder's capacity, additional transponder resources can be allocated to that channel from another channel which is not using all of its allocated transponder resources at the moment.

In computing, a virtual machine (also designated by the acronym VM) is an emulation of a particular computer system. Virtual machines operate based on the computer architecture and functions of a real or hypothetical computer, and their implementations may involve specialized hardware, software, or a combination of both.

Classification of virtual machines can be based on the degree to which they implement functionalities of targeted real machines. That way, system virtual machines (also known as full virtualization VMs) provide a complete substitute for the targeted real machine and a level of functionality required for the execution of a complete operating system.

The use of VMs provides a great flexibility in the handling of tasks to execute in parallel. Indeed, VMs can be created and deleted very easily to meet the needs of tasks processing that evolve in real time. Moreover, VMs provide a great flexibility for creating machines with the desired properties, since the actual characteristics of a VM are a combination of software characteristics and characteristics of the hardware machine on which the VM is executed.

This flexibility is especially useful in multimedia processing. Indeed, multimedia task are known to require significant resources, and the flexibility of allocation of resources to VMs permit to create machines having resources just sufficient to execute a multimedia task. In a multimedia headend server, VMs can thus be created dynamically upon the request of clients to obtain a multimedia service. When creating a virtual machine, it is possible to adjust the parameters of the machine, for example its CPU, RAM, and/or bandwidth. The necessary resources are then reserved on the host hardware machine. For example, when creating a VM with 4 GB RAM, 4 GB of RAM will be reserved for this VM on the host hardware machine, in order to ensure that the VM will have enough RAM to operate. Thus, the sum of all resources reserved by the VMs on a host machine cannot exceed the resources of the host machine, and the reservation of resources for a VM mitigates the ability of a hardware machine to host additional VMs for performing further multimedia processing.

It is thus advantageous to dispatch the processing tasks to perform amongst the available machines in order that they have the least possible unused resources. To achieve this goal, it is desirable to obtain, for processing tasks to execute, an evaluation of the resources needed to perform a task, and for machines, an evaluation of the available resources.

This is especially true for multimedia processing, in which many tasks are computationally-intense tasks that have to be performed in real time with a target of quality. For example, it is possible to encode video content with different levels of quality. More resources are usually needed for higher levels of quality. Indeed, it is usually necessary to perform more complex video coding decisions to improve the quality of video at an equivalent bitrate. A VM thus needs a minimum amount of resources to perform video encoding in real time at a desired level of quality.

The usual method for defining the resources of a machine rely on an evaluation a priori of the resources necessary to perform a task. For example, if the CPU necessary to perform a task is known, the CPU of a VM being also known, it is straightforward to infer how many instances of a task may run in parallel on the machine.

Although this works for simple calculation tasks, it is almost impossible to calculate a priori the resources necessary to perform multimedia processing. Indeed, the ability to perform a task depends upon complex interactions between CPU, memory, and the like. Moreover, the ability to perform multimedia processing with a desired level of quality in real time is highly dependent on the content of the multimedia streams to be processed. For example, the resources necessary to encode a video scene increase with the resolution of the scene. But it is also dependent on the content of the scene. For example, video scenes comprising water and waves are known to be highly difficult to encode, both in terms of encoding time and compression levels. Other parameters such as the frame rate or encoding parameters have an impact on the resources necessary to encode a video, which renders an a priori evaluation of the performance of a machine even more difficult.

Another possible approach to overcome this issue consists in calculating, for a given multimedia task, the minimum required amount of resources, by running the task and observing the footprint of the execution of the task. However, this approach may only be used with machines with standardized configurations, and is not adapted to virtual machines, in which the combination of hardware and software machines produces much more flexibility in the creation of machines, while bringing uncertainty about the actual capacity of a VM to be created.

FIG. 1 displays an example of determination of available resources on a machine of the prior art. The prior art method consists in running a multimedia processing 130 on a target machine 120. The multimedia processing 130 takes multimedia data 110 as input, and outputs processed multimedia data 140. The execution of the multimedia processing 130 on the machine 120 allows the calculation of a minimal machine configuration 150 necessary to execute the processing 130. The calculation of the minimal machine configuration 150 can be performed by observing the minimum resources needed by the multimedia task 130 to run. The minimum resources comprise for example a minimum CPU, a minimum memory, a minimum bandwidth, and so on. For example, the minimum CPU resources to run the processing can be observed by observing the maximum CPU used by the processing 130 when run on the target machine.

This prior art method allows the determination of minimum resources necessary to run a multimedia processing. However, it is only applicable to a predefined, standard type of platform. Indeed, the execution of a processing is highly dependent of the fixed physical attributes, such as memory and CPU, of the type of machine performing the execution. This method is thus not applicable to virtual machines. Indeed, the flexibility of the creation of virtual machines induces the permanent creation of new types of machines. For example, even if a virtual machine is defined by, amongst other resources, a nominal CPU and a nominal amount of memory, the type and behavior of machine will be different depending on the physical machine on which the virtual machine is running.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
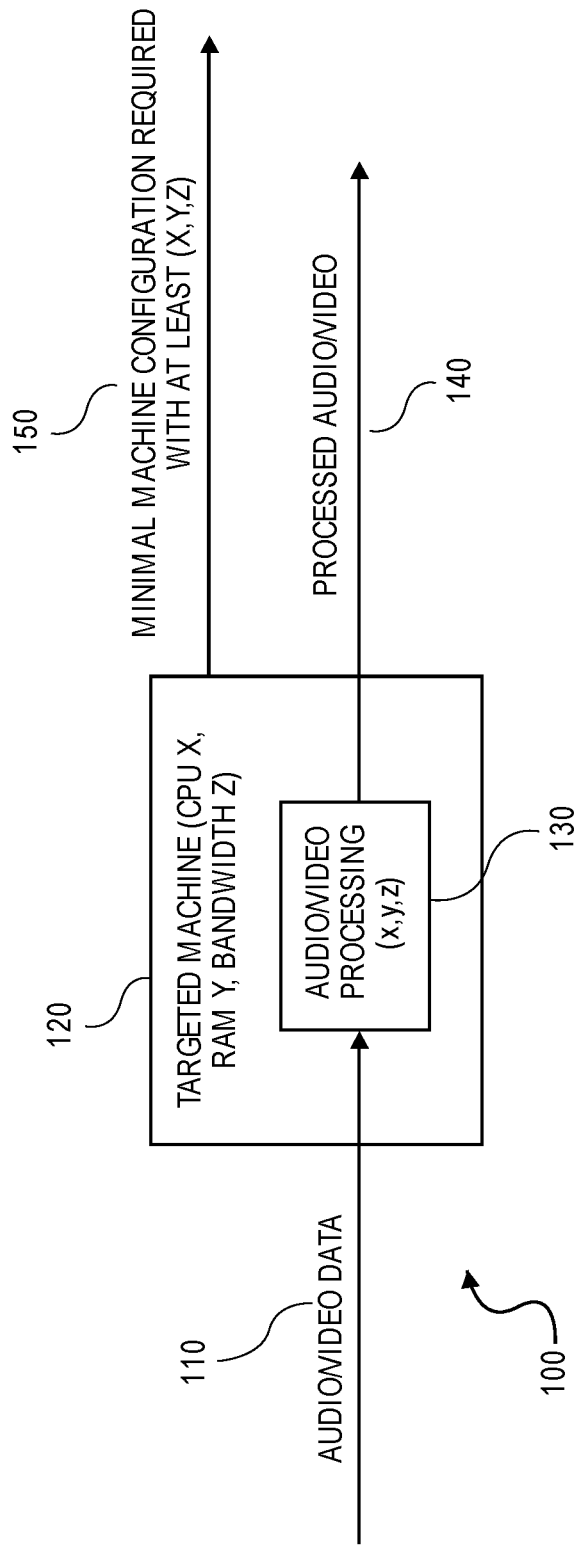
FIG. 1 displays an example of the determination of available resources of a machine according to the prior art.

Approaches for dynamically allocating CPU cycles vis-à-vis adjustments to a virtual machine processing a video stream are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

A digital video encoder is hardware component, configured with software, which converts digital video from one format to another. It may be advantageous or necessary to change the format in which a digital video file is expressed for a variety of reasons, such as to achieve, gain, or promote standardization, speed, secrecy, security, and/or compression. A digital video encoder may support encoding more than one digital video stream at a time. As a specific example of a digital video encoder, the Electra 8100 is a single rack-unit (1-RU) encoder with a multi-standard, multi-service and multi-channel capability available from Harmonic, Inc. of San Jose, Calif. The Electra 8100 supports encoding 4 channels simultaneously per chassis (1-RU).

A digital video encoder may comprise multiple central processing units (CPUs or cores). For example, the Electra 8100 encoder includes four CPUs. Software responsible for encoding functionality is typically written to execute on a single CPU. Therefore, four difference instances of the encoding software (individually referred to as an "encoding module") may execute on the Electra 8100, each of which is designed to execute upon a separate CPU. Accordingly, in the prior art, each encoding module is designed to execute instructions using a single CPU.

Embodiments of the invention enable the cycles of each CPU of a digital video encoder to be more efficiently utilized by encoding modules. In an embodiment of the invention, at periodic intervals, the video complexity of a portion of the unprocessed (i.e., not yet encoded) digital video carried in the video streams being processed by the digital video encoder may be determined. After determining the complexity of a portion of the digital video in each digital video stream being processed by the digital video encoder, the number of CPU cycles allocated to each encoding module may be dynamically adjusted. The adjustment may be made to ensure that each encoding module has been allocated the most optimal proportional share of CPU cycles given the complexity of the digital video each encoding module is responsible for encoding at any moment in time. In this way, if a particular digital video stream is particularly complex and requires additional CPU cycles to process, then the encoding module responsible for encoding that particular digital video stream may receive an additional allocation of CPU cycles which were previously allocated elsewhere.

In an embodiment, the additional CPU cycles allocated to the encoding module may only be temporary allocated while an encoding module is actively encoding the complex portion of digital video. In other embodiments, the additional CPU cycles allocated to the encoding module may be permanently allocated until a subsequent adjustment to the allocation is made. Advantageously, embodiments of the invention enable the CPU cycles of a digital video encoder to be dynamically allocated to optimize the quality of the encoded digital video produced by the digital video encoder.

Embodiments of the invention allow for CPU cycles to be dynamically adjusted by several approaches. An embodiment of the invention may dynamically adjust the number of CPU cycles allocated to each encoding module by adjusting the amount of CPU cycles allocated to the particular virtual machine in which the encoding module executes. As another example, an embodiment of the invention may dynamically adjust in which virtual machine an encoding module is currently executing, and the new virtual machine responsible for executing the encoding module may be allocated a different amount of CPU cycles than the prior virtual machine in which the encoding module executed.

Embodiments of the invention may estimate a computing capacity of a virtual machine, which is useful in identifying a suitable virtual machine to execute a particular encoding module based on the work it is performed as well as determining whether a particular virtual machine, in which an encoding module is currently executing, is at computing capacity.

Dynamic Adjustment of CPU Cycles to Video Encoding Processes

Figure 2:
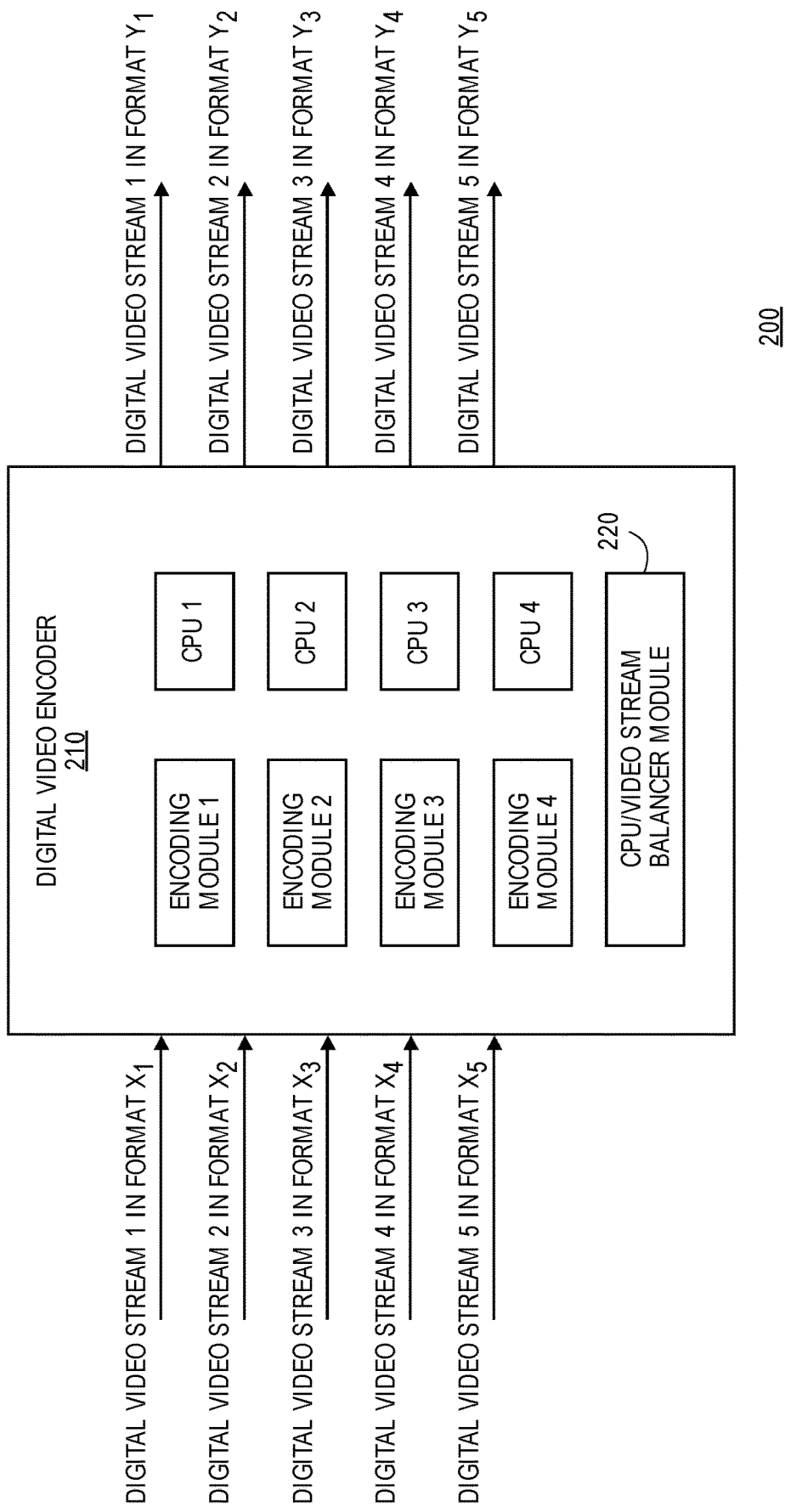
FIG. 2 is a block diagram of the functional components of one embodiment of the invention.

FIG. 2 is a block diagram 200 of the functional components of a digital video encoder 210 according to an embodiment of the invention. Digital video encoder 210 is a computer system which is designed to convert digital video streams from one format to another. For clarity, in FIG. 2, the format of incoming digital video streams (i.e., video steams not yet encoded by digital video encoder 210) are depicted in the format of $X_{stream\ number}$, while the format of outgoing digital video streams (i.e., video streams which have been encoded by digital video encoder 210) are depicted in the format of $Y_{stream\ number}$.

Digital video encoder 210, as depicted in FIG. 2, comprises four CPUs; however, digital video encoder 210 may comprise any number of CPUs. In an embodiment, digital video encoder 210 may be implemented using computer system 800, which is explained in further detail below with reference to FIG. 8.

Digital video encoder 210, as depicted in FIG. 2, comprises four encoding modules. An encoding module, as used herein, refers to software responsible for encoding a particular digital video stream from one format to another format. For example, encoding module 1 may be responsible for encoding digital video stream 1 from format $X_1$ to format $Y_1$. While FIG. 2 depicts four encoding modules, in embodiments of the invention, digital video encoder 210 may comprise any number of encoding modules; the number of encoding modules in digital video encoder 210 is independent of the number of CPUs in digital video encoder 210. An encoding module of an embodiment may be executed using CPU cycles from any CPU of digital video encoder 210.

Digital video encoder 210 also comprises CPU/video stream balancer module 220 (hereafter "balancer module" 220). Balancer module 220 is software responsible for adjusting the number of cycles of CPUs of digital video encoder 210 allocated to encoding modules also executing on digital video encoder 210. To do so, balancer module 220 examines the complexity of the digital video which will be processed in the near term by the digital video encoder 210. Recognizing that the complexity of the digital video being carried by each stream may vary, balancer module 220 renders a judgment as to the best allocation of the CPU cycles available from the CPUs of the digital video encoder 210 to each encoding module based on the complexity of the digital video each encoding module will soon be processing. Balancer module 220 may, in certain embodiments, instantiate a virtual machine having a desired allotment of CPU cycles or may adjust an allocation of CPU cycles to a currently instantiated virtual machine.

Figure 3:
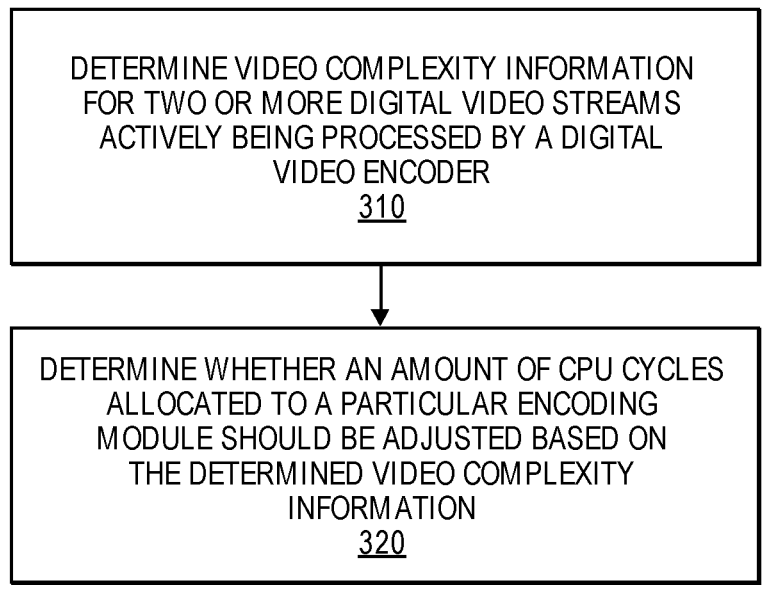
FIG. 3 is a flowchart illustrating the steps of dynamically allocating CPU cycles for use in processing a video stream according to an embodiment of the invention.

In an embodiment of the invention, balancer module 220 performs the steps depicted in FIG. 3. FIG. 3 is a flowchart illustrating the steps of dynamically allocating CPU cycles for use in processing a video stream according to an embodiment of the invention. In an embodiment, balancer module 220 may perform the steps of FIG. 3 at regular intervals. For example, balancer module 220 may dynamically adjust the CPU cycles allocated to encoding modules of digital video encoder after each frame of digital video is processed in a particular stream or each time after a certain number (such as two or more) of frames of digital video are encoded in a particular stream. Alternately, balancer module 220 may dynamically adjust the CPU cycles allocated to encoding modules of digital video encoder 210 each time after a frame of digital video has been encoded in each video stream or each time after a certain number (such as two or more) of frames of digital video in each video stream have been encoded. In another embodiment, balancer module 220 may dynamically adjust the CPU cycles allocated to one or more encoding modules of digital video encoder 210 repeatedly after a certain period of time (such as the expiration of a predetermined number of milliseconds) has transpired or repeatedly after a certain number of CPU clock cycles has occurred.

Figure 4:
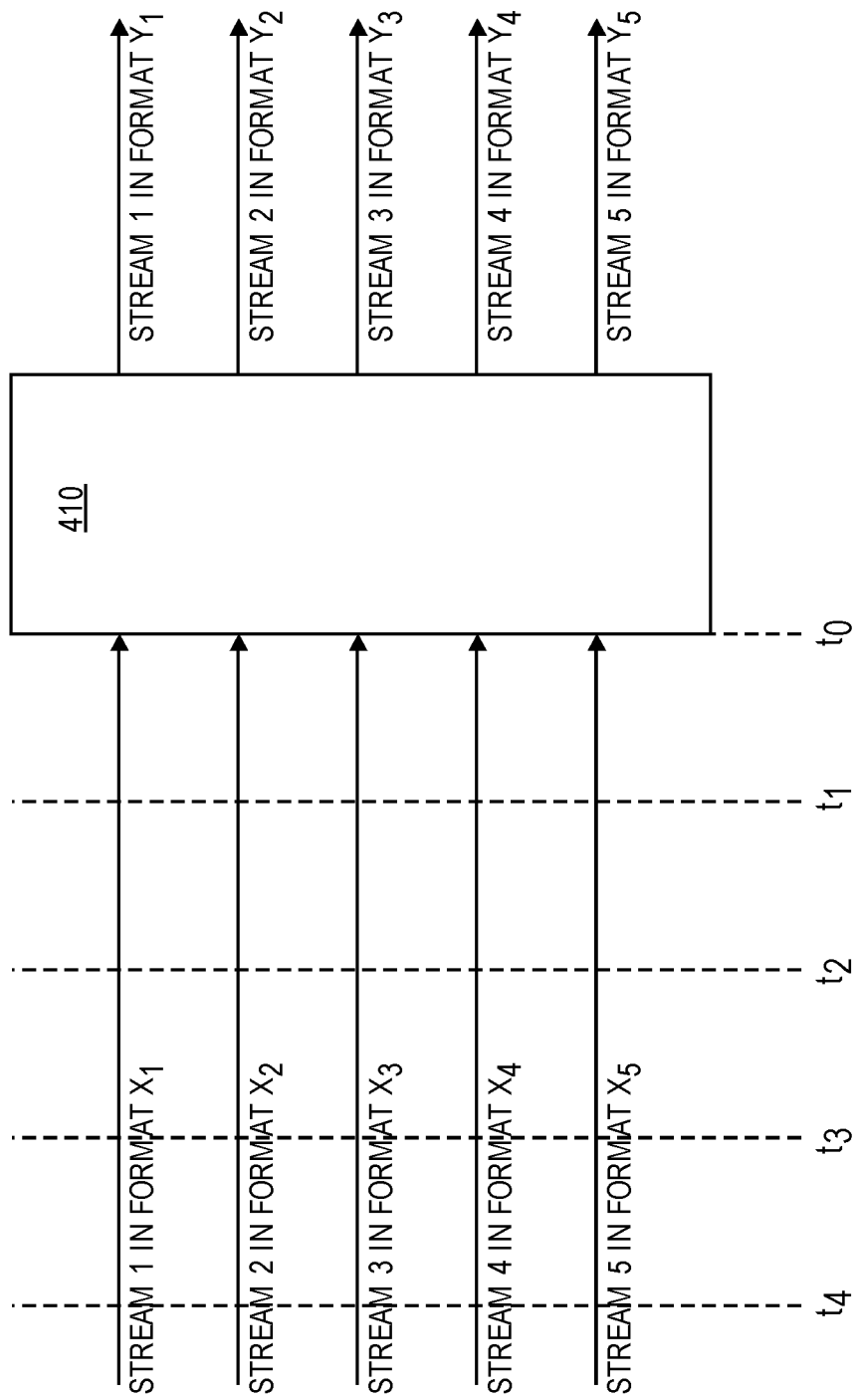
FIG. 4 is an illustration of digital video recorder encoding a plurality of digital video streams according to an embodiment of the invention.

Initially, in step 310 of FIG. 3, video complexity information for two or more digital video streams actively being processed by digital video encoder 210 is determined. To better appreciate the performance of step 310, it may be helpful to illustrate the performance of step 310 with respect to FIG. 4, which is an illustration of digital video recorder 410 encoding a plurality of digital video streams according to an embodiment of the invention.

The video complexity information determined in step 310 describes the complexity of digital video carried by each digital video stream being processed by digital video encoder 210 across a bounded interval. For example, since there are five digital video streams being encoded by digital video encoder 410 in FIG. 4, then the video complexity information determined in step 310 would describe the complexity of the digital video in each of the five streams in the example of FIG. 4.

The complexity of a digital video is a measure of how much data it takes to describe how to display the digital video. The amount of data required to represent a digital video increases with the complexity of the digital video. For example, digital video rendered at a higher quality requires more data bits to express than the same digital video rendered at a lower resolution. As another example, it takes more information to describe how to display moving objects on a screen than how to describe non-moving images; therefore, digital video depicting content in motion (such as World Cup football match) requires more data bits to express than content having fewer moving parts. Digital video may also support certain features which add to its complexity.

Embodiments of the invention may employ any known or subsequently developed techniques for assessing the complexity of digital video in the performance of step 310.

The video complexity information determined in step 310 is intended to describe the complexity of the digital video not yet processed by digital video encoder 210 measured over a predetermined period or interval. For example, in an embodiment, video complexity information determined in step 310 may cover from the interval bounded by time $t_0$ to time $t_1$, whereas the intervals bounded by $t_0$ and $t_1$ may be measured by frames of digital video, CPU cycles since being received by digital video encoder 410, or milliseconds since being received by digital video encoder 2410. As another example, video complexity information determined in step 310 may cover from the interval bounded by time $t_0$ to time $t_4$, whereas the intervals bounded by time $t_0$, $t_1$, $t_2$, $t_3$, and $t_4$ may be measured by frames of digital video, CPU cycles since being received by digital video encoder 410, or milliseconds since being received by digital video encoder 410. Note that t0 represents the time when digital video encoder 410 begins processing the digital video stream; consequently, the frames of digital video in digital video streams in the intervals bounded by $t_0$, $t_1$, $t_2$, $t_3$, and $t_4$ have not yet processed by digital video encoder 410.

In step 320, balancer module 220 determines whether the current amount of CPU cycles allocated to a particular encoding module should be adjusted based on the video complexity information determined in step 310. The purpose of performing step 320 is to ensure that the CPU cycles provided by the CPUs within digital video encoder 210 are allocated to encoding modules to maximize the quality or desirability of digital video across the digital video streams being encoded by digital video encoder 210. Therefore, if balancer module 220 does determine in step 320 that the complexity of an upcoming portion of digital video which will be handled by a particular encoding module requires an additional CPU cycles to process to ensure the desired video quality, then balancer module 220 will dynamically adjust how many CPU cycles are allocated to that particular encoding module accordingly. Balancer module 220 may perform step 320 on any number of encoding modules, such as a single encoding module or two or more encoding modules.

In an embodiment, balancer module 220 may consult one or more policies which define criteria for determine how to optimize the allocation of CPU cycles to the processing of digital video streams. For example, certain digital video channels may be assigned a greater weight than other digital video channels. In doing so, balancer module 220 may assess certain digital video channels at a greater importance than other digital video channels. In this way, certain digital video channels may be designated premium channels that have a greater insurance of being encoded at the highest quality possible.

When allocating additional CPU cycles to an encoding module, it will be necessary to proportionally reduce the amount of CPU cycles previously allocated to another encoding module. For example, if balancer module 220 of FIG. 2 determines in step 320 to increases the allocation of CPU cycles to encoding module 1, then it will be necessary to reduce the CPU cycles previously allocated to one or more of encoding modules 2, 3, and 4 in the same aggregate amount. Ideally, it would be beneficial to decrease the allocation of CPU cycles in a way which minimizes the impact of doing so. For example, encoding module 2 may not require all the CPU cycles previously allocated thereto, and so it would be beneficial to reduce CPU cycles to encoding module 2 before decreasing the CPU cycles allocated to another encoding module which is using all of its previously allocated CPU cycles.

Therefore, in an embodiment, when dynamically increasing an amount of CPU cycles allocated to process the particular digital video stream, the impact of decreasing CPU cycles previously allocated to one or more encoding modules is considered. Note that any number of encoding modules may have their allocated share of CPU reduced so long as the total amount reduced equals or compensates for the increase of CPU cycles to other encoding modules.

For example, if encoding module 1 of FIG. 2 has its share of allocated CPU cycles increased by 4% in step 320, then encoding module 2 may have its share of allocated CPU cycles decreased by 4%, or encoding module 2 and encoding module 3 may each have their share of allocated CPU cycles decreased by 2%, or encoding module 2 and encoding module 3 may each have their share of allocated CPU cycles decreased by 1% while encoding module 4 may have its share of allocated CPU cycles decreased by 2%. The particular way in which encoding modules have their share of previously allocated CPU cycles decreased will be based on minimizing the impact upon the quality of encoded digital video produced by those encoding modules.

In adjusting the share of allocated CPU cycles from a first encoding module to a second encoding module, it may be necessary in certain embodiments to identify one or more features in the digital video stream being processed by the first encoding module in which support for will be reduced or ceased during the time when the allocated of CPU cycles is reduced.

Embodiments of the invention may employ a variety of different techniques for calculating how many CPU cycles will be needed to process a particular level of digital video complexity. For example, in certain embodiments, balancer module 220 may store and consult records comprising historical data of prior CPU cycle requirements for different levels of digital video complexity. Balancer module 220 may also employ certain algorithms to extrapolate CPU cycle requirements based on the stored historical data of prior CPU cycle requirements for different levels of digital video complexity. Balancer module 220 may also perform process 500 of FIG. 5 to identify or extrapolate CPU cycle requirements based on the stored historical data of prior CPU cycle requirements for different levels of digital video complexity.

FIG. 2 depicts a plurality of encoding modules executing on a single digital video encoder 210. Embodiments of the invention may be used to allocate CPU cycles to any number of encoding modules executing on a digital video encoder. Moreover, embodiments of the invention may be employing in an environment that uses two or more digital video encoders 210, such as a number of federated digital video encoders 210 or a plurality of digital video encoders 210 operating in a cloud environment or in communication with each other over a network, such as a private or public network. Thus, embodiments of the invention may be employed with any number of encoding modules, and the encoding modules used by embodiments may be, but need not, reside on a single physical machine. In other words, embodiments of the invention may be used to allocate CPU cycles to encoding modules regardless of their location in a distributed computing environment, as embodiments may allocate CPU cycles to encoding modules executing on different physical machines in a cloud or distributed computing environment.

In embodiments, each digital video encoder 210 may execute within a virtual machine. Embodiments of the invention may allocate CPU cycles to encoding modules 210 by dynamically adjusting the number of CPU cycles assigned to a virtual machine or by executing an encoding module 210 in a different virtual machine allocated to a different amount of CPU cycles.

Figure 5:
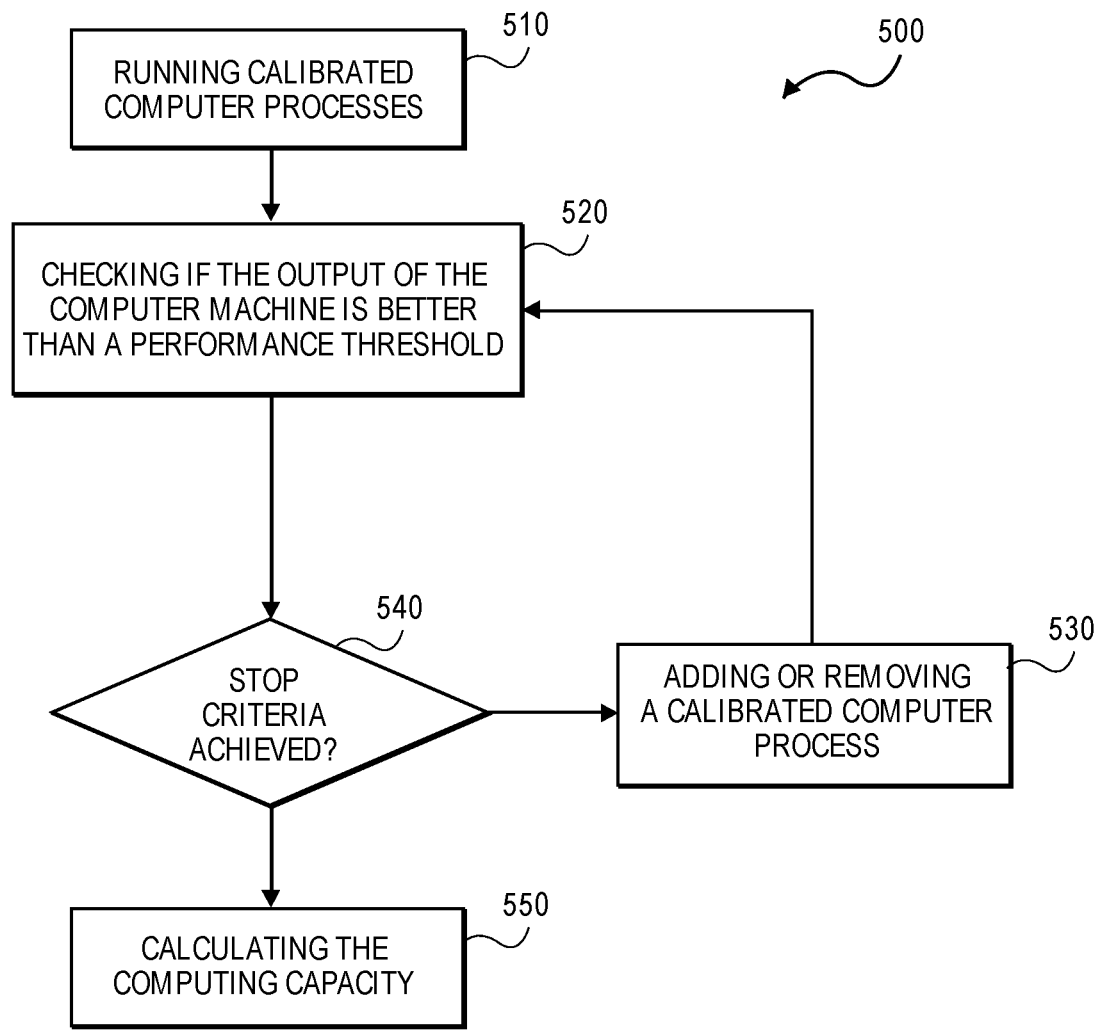
FIG. 5 is a flowchart of a process of estimating a computing capacity of a virtual machine according to an embodiment of the invention.

FIG. 5 is a flowchart of a process 500 of estimating a computing capacity of a virtual machine according to an embodiment of the invention. Process 500 comprises running 510 on the computing machine a number of calibrated computer processes, each of the computer processes having a calibrated computing load, a calibrated computing load being defined by one or more of a CPU load, a memory load, and a bandwidth load, where the calibrated computing load having a number of values.

Process 500 is particularly suited for estimating a computing capacity of a virtual machine, but it may also be used for calculating a computing capacity of a physical machine or another type of computing capability, such as a Linux Container, wherein different OS instances run on different partitions of a physical machine.

These calibrated computer processes may, for example, be multimedia processes such as video encoding, video transcoding, audio encoding, DRM application, and the like. The calibrated computing load is representative of the resources necessary to run a process in real time. In multimedia processing, and more specifically in video processing, the resources needed to perform a task are dependent on the task itself, but also on input data, on parameters to perform a task and the required result.

For example, the resources needed for encoding a video are dependent on the complexity of the video codec used (by means of example, encoding a video in H.265 is known to be more complex than in H.264), the parameters of encoding, but also on characteristics of the input video (i.e. resolution, bit depth, brightness, type of scene, and so on), and also on the level of quality to achieve. It is for example known that it requires less resources to encode a video using a poor-quality encoding than an average or high quality of encoding. Indeed, a poor quality of video encoding can be achieved using very simple video coding decisions, while obtaining video with high quality encoding needs to be performed using costly decisions, for example complex estimation of movement or complex frame partitioning. Thus, a calibrated computer process can be defined at least by a type of multimedia task, and, when applicable, the input data on which the task is performed.

Process 500 further comprises checking 520 if an output of the computing machine matches or is better than a performance threshold, the performance threshold being defined by one or more of a quality parameter of the output and a latency parameter between an input into the computing machine and an output from the computing machine.

This step consists of analyzing the output of processes run at step 510. The analysis of the output may consist in calculating a quality metrics at the output of the processes running. For example, a PSNR (Peak Signal Noise Ratio), SSIM (Structural SIMilarity), MS-SSIM (Multi-Scale Structural SIMilarity), Delta, MSE (Mean Squared Error), or any other standard or proprietary metrics may be calculated for a video at the output of a video encoding process. When applicable, such metrics may be computed on the video as a whole, or a layer of the video, for example one of the R,G,B layer of the RGB colorspace, one of the Y,U,V layer of a YUV colorspace, or any layer or combination of layers of a type of colorspace.

Thus, a calibrated computer process can be defined for example by a type of multimedia task, and one or more of an input data, and a threshold of quality of the result to be obtained. The quality of the result to obtain can be expressed for example using quality parameter (such as a PSNR (Peak Signal Noise Ratio), SSIM (Structural SIMilarity), MS-SSIM (Multi-Scale Structural SIMilarity), Delta, MSE (Mean Squared Error), or any other standard or proprietary metrics of a video). The quality of the result may also be expressed as latency between the start and the completion of a calibrated computer process. For example, one criteria for the success of a video encoding process may be achieving a video encoding with an output video having a PSNR of 40 dB, in 5 seconds.

When a single computer calibrated process is running on the computing machine, step 520 may consist of checking if the output of this single process matches or is better than its performance threshold. For example, in the above example, it can be considered that the encoding of the video is successful if an output video with a PSNR equal or superior to 40 dB is obtained, in 5 seconds or less.

When a plurality of computer calibrated processes is running on the computing machine, checking the output of the computing machine may consist in checking if each process was successful. The ability of a calibrated computer processes to successfully achieve its result depends not only on the process itself and the machine on which it is executed, but also on the other processes running in parallel. Indeed, when several processes run in parallel on a machine, they share the resources of a machine. For example, a video encoding process which can achieve a video encoding at 40 dB in 5 seconds when running alone, may be forced, if a second process is running on the machine, to spare CPU resources, and lower the quality of encoding to encode the video, thus encoding the video at a PSNR lower than 40 dB.

One of the principles of the invention lies in the possibility to run in parallel a variable number of calibrated computer processes having different computing loads, in order to verify that the computing load of processes that can be run in parallel on the machine. To this effect, step 530 comprises iteratively adding or removing a calibrated computer process of a selected value in the number of values of a calibrated computer load until a stop criteria defined by a required level of precision is achieved (step 540).

Step 530 may involve adding or removing a calibrated computer process in order to run on the machine a number of processes having a total computing load as close as possible to the computing capacity of the machine.

Step 540 may comprise verifying if a stop criterion is achieved. The stop criterion is defined by a required level of precision on the computing load. The required level of precision may be representative of the precision with which the computing capacity needs to be known. For example, a stop criterion may be achieved if, before adding a calibrated computer process having a computing load lower than the required level of precision, the output of the computer machine does not match the performance threshold, while it did not alter the addition of the calibrated computer process. On the contrary, a stop criterion may be achieved if, after the removal a calibrated computer process having a computing load lower than the required level of precision, the output of the computer machine matches the performance threshold, while it did not before the removal of the calibrated computer process.

Process 500 further comprises a step 550 of calculating the computing capacity of the computing machine as the sum of the calibrated computing loads of the calibrated computer processes running on the computing machine when the stop criterion is achieved.

In a number of embodiments of the invention, computer processes are added in a decreasing order of computing loads, in order to progressively refine the precision of the calculation of the computing load of the computing machine. This may be done by adding or removing calibrated computer processes having a predefined computing load, then, adding or removing processes with a lower computing load, and so on. In a number of embodiments of the invention, adding or removing processes with a lower computing load is performed when a switch criterion is met. In an embodiment of the invention, a switch criterion is met when n instances of a process run successfully in parallel, and, upon the addition of an $n+1^{th}$ instance, the instances of the process do not run successfully in parallel. At this stage, the estimation of the computing capacity of the machine can be further refined by running in parallel n instances of the process, and iteratively adding or removing instances of a process having a lower computing load. Examples of addition and removal of processes are provided with reference to further figures.

Various methods are possible for determining the calibrated computing load of calibrated computing processes. In a number of embodiments of the invention, the computing load of a calibrated computer process is obtained by evaluating the number of instances of said calibrated computer process that can run in parallel on a reference computing machine having a known computing capacity, while verifying a desired output.

Figure 6A:
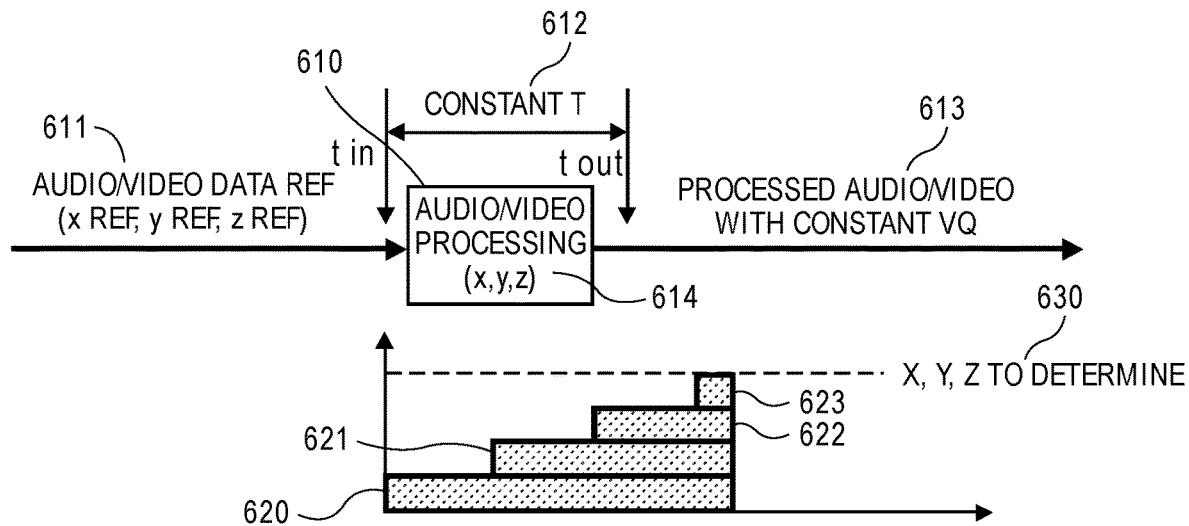
FIGS. 6A, 6B, 6C, and 6D are illustrations of four examples of iterative addition or removal of computer calibrated processes according to embodiments of the invention.

FIGS. 6A, 6B, 6C, and 6D display four examples of iterative addition or removal of computer calibrated processes in accordance with certain embodiments of the invention. FIG. 6A displays a first example of iterative addition or removal of computer calibrated processes in a number of embodiments of the invention. In this example, process 500 is used for iteratively adding instances of a computer calibrated process 610 in order to determine computing capacities 630 of a target machine. The computing capacities are labeled X, Y, Z and may represent for example the CPU, the amount of RAM and the bandwidth of the machine.

The computer calibrated process 610 is, in this example, a multimedia process, for example an image or an audio process. It is applied to input data 611. The process is considered as having been successful if it processed the multimedia content into a processed output 613, said processed output having a level of quality equal or greater to a threshold, while having run with a latency equal or below a threshold latency 612. By means of non-limitative example, the desired quality is noted "VQ" for "Video Quality" on the figure. However, the invention is applicable to any type of quality of any multimedia stream.

In an embodiment of the invention, four instances 620, 621, 622, and 623 of the process 610 are iteratively added to run in parallel on the target machine. After each instance of the process 610 has been added the instances of the process run in parallel for one or a plurality of iterations. The method then checks, at the output of the target machine, if the calibrated computing process was successful, i.e., if it produced a processed multimedia at a quality on or above VQ 613 with a latency on or below T 612. If a plurality of iterations of each process is performed, the output of the process is considered as unsuccessful if at least one iteration of the process produced an unsuccessful result.

After the respective addition of the instances 620, 621, and 622, the resources of the target machine are sufficient to successfully run the instances in parallel. Thus, the instances of the process 610 produce a result with a sufficient quality at a latency equal or below the latency T 612. On the contrary, when adding the fourth instance 623, the target machine has not anymore enough resources to run the four instances in parallel. Thus, at least one of the instances does not produce the desired result. then calculates the resources X, Y, Z of the target machine as the sum of the resources x,y,z of the instances 620, 621, 622 respectively, i.e. three times the resources x,y,z of the process 610 respectively.

Figure 6B:
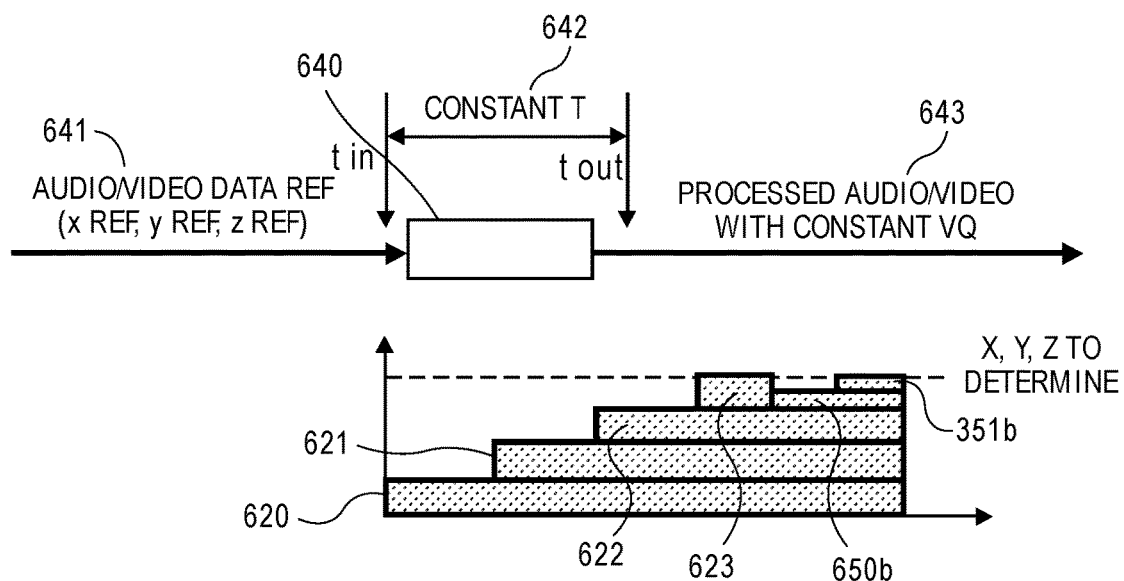

FIG. 6B displays a second example of iterative addition or removal of computer calibrated processes according to an embodiment of the invention. This second example relies on the addition and removal of instances of the process 610, and of instances of a second process 640. Similar to process 610, process 640 has input data 641, a latency 642, and a threshold of quality for the output 643. The second process 642 also has calibrated computer loads x2, y2, z2, these calibrated computer loads being lower than the calibrated computer loads of the first process.

In this example, the four instances 620, 621, 622, 623 of the process 610 are added, similarly to the example depicted on FIG. 6A. After adding the fourth instance 623 of the process 610, the four instances are not able to successfully execute in parallel. In this example, the calibrated computer loads x,y,z do not match the target level of precision for the computing capacity of the machine. Instead of meeting a stop criterion, the method thus meets a switch criterion, and successively adds instances 650b and 651b of the second process 640, whose calibrated computer loads x2, y2, z2 are equal or below the target level of precision of the computing capacity of the machine.

When running the three instances 620, 621, 622 of the process 610, and the first instance 650b of the second process 640, the execution of the processes is successful: the processed multimedia content matches the desired level of quality, and the latencies of the execution are lower than the latencies 612 and 642, respectively. In contrast, after adding a second instance 651 of the process 640, the sum of the calibrated computer loads of the processes running is above the computing capacity of the machine: at least one of the instances of the processes running is not successful. Since the calibrated computer loads x2, y2, z2 of the second process are lower than the target precision, the stop criterion is met, and the computing capacities X, Y, Z of the machine is calculated as [X, Y, Z]=3*[x, y, z]+[x2, y2, z2].

In other embodiments of the invention, the calibrated computing load can be further refined by adding and removing instances of processes having even lower computer calibrated loads.

Figure 6C:
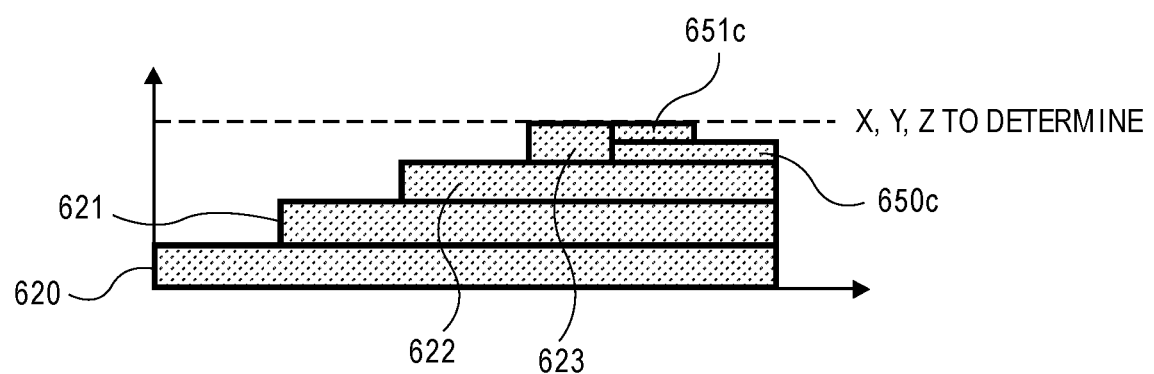

FIG. 6C displays a third example of iterative addition or removal of computer calibrated processes in accordance with an embodiment of the invention. Similar to the example of FIG. 6B, in the example of FIG. 6C instances of the processes 610 and 640 are iteratively added and removed, starting from the fourth instances 620, 621, 622 and 623 of the process 610, and a switch criterion is met after the addition of the fourth instance 623 of the process 610. In this example, the computer loads x2, y2, z2 of the second process 640 are supposed to be half the computer loads x,y,z of the first process 610.

In this embodiment of the invention, once the switch criterion is met, two instances 650c, 651c of the second process 640 are added. The sum of calibrated loads of the instances of processes running being higher than the computing capacity of the machine, the desired output is not achieved. In this embodiment, instances of the second process are iteratively removed until the output of all instances of processes running matches the desired output.

In this example, the instance 651c of the second process 640 is removed. Then, the instances running match the desired output, the stop criterion is met, and the computing capacities X, Y, Z of the machine is calculated as [X, Y, Z]=3*[x, y, z]+[x2, y2, z2].

Figure 6D:
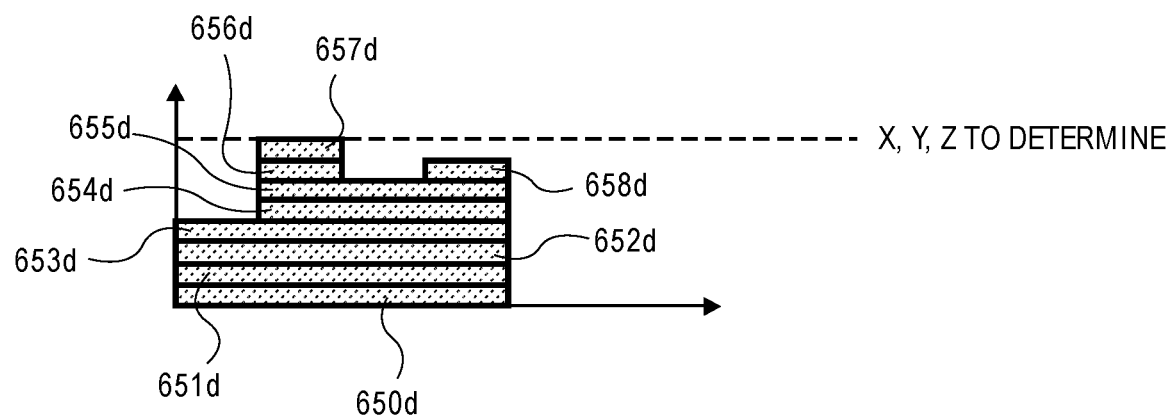

FIG. 6D displays a second example of iterative addition or removal of computer calibrated processes in accordance with an embodiment of the invention. In this example, only instances of the second process 640 are used. In order to avoid a large number of iterations, the number of instances of the second process 640 are added or removed by groups of four instances, then two, then one.

In this example, four instances 650d, 651d, 652d, 653d of the second process 640 are initially added, without exceeding the computing capacities of the machine. The correctness of the output of the process being verified, four additional instances 654d, 655d, 656d, 657d are added. After the execution of the 8 instances, the output of at least one instance of a process does not match the expected result. Then two instances, 656d and 657d, are removed. The result of the processes matches the thresholds of quality. A last instance 658d of the process 640 is added. The result of the processes matches the thresholds of quality. Thus, it can be determined that the output of 7 instances of the process 640 running in parallel on the machine match the target threshold of quality, while it had already been checked, when the instances 650d to 657d were running in parallel, that the output of 8 instances of the process 640 running in parallel does not match the target threshold of quality.

The computing capacities X, Y, Z of the machine are then calculated as [X, Y, Z]=7*[x2, y2, z2].

Embodiments of the invention are not restricted to the examples given above, that are provided as non-limitative examples only. A number of different ways of adding and removing processes are possible. For example, three or more processes of different types may be added or removed, it is possible to add or remove instances of a plurality of different processes at the same time.

Figure 7:
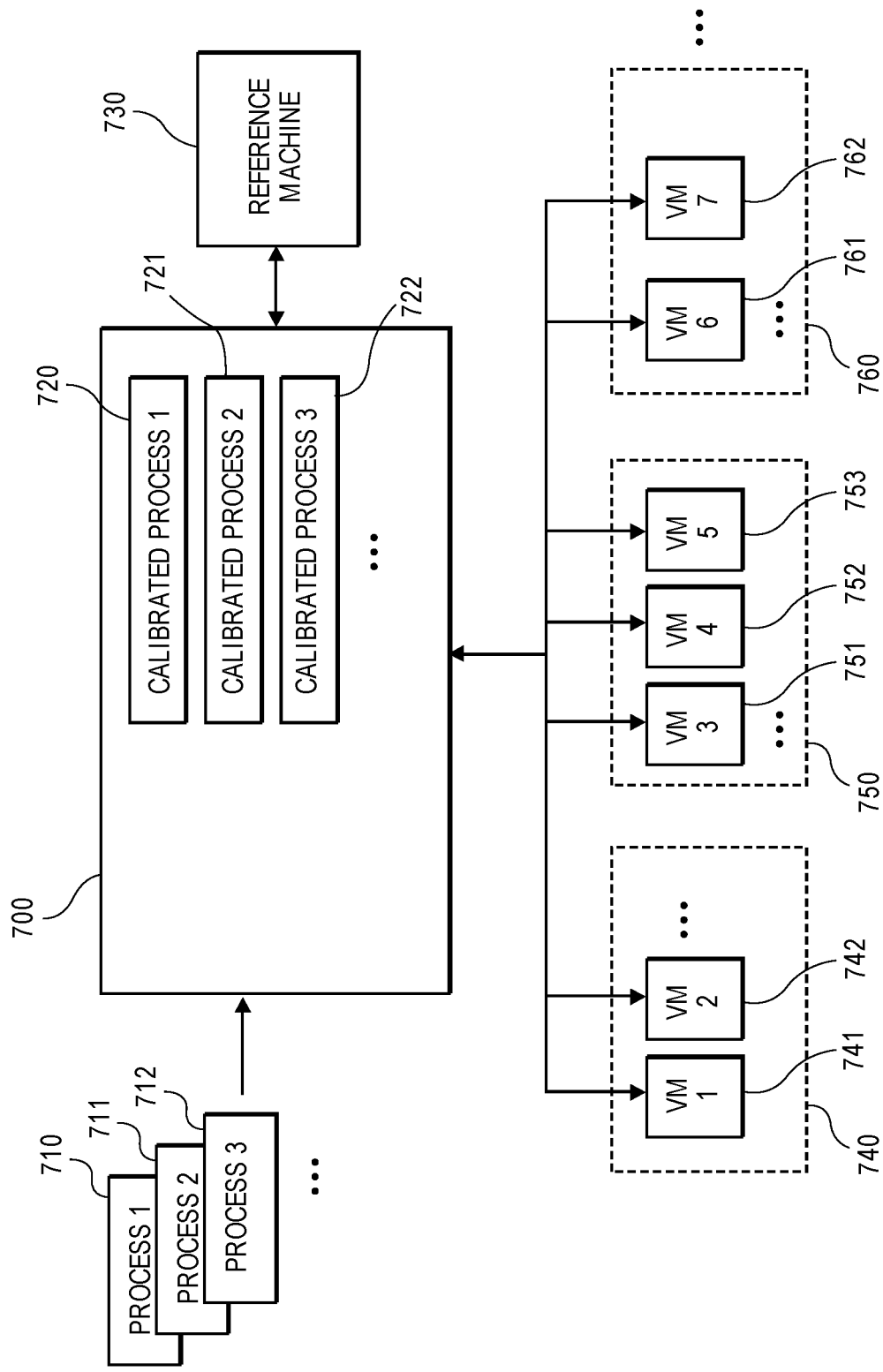
FIG. 7 is an illustration of a scheduler configured for dispatching a plurality of tasks amongst a plurality of virtual machines according to an embodiment of the invention.

FIG. 7 displays a scheduler configured for dispatching a plurality of tasks amongst a plurality of virtual machines according to embodiments of the invention. The scheduler displayed on FIG. 7 is provided by means of non-limitative example only. Notably, the example depicted in FIG. 7 is configured for dispatching tasks on virtual machines, while another scheduler according to the invention may dispatch tasks on physical machines.

Scheduler 700 is configured for dispatching processes, for example the processes 710, 711, 712, amongst a plurality of virtual machines. For example, it may run the processes on the virtual machines 741, 742, 751, 752, 753, 761, 762, respectively running on the machines 740, 750, and 760.

In order to dispatch the processes in an efficient way, scheduler 700 uses a process 500 according to an embodiment of the invention in order to estimate a computing capacity of the virtual machines 741, 742, 751, 752, 753, 761, 762. It may for example use the computer calibrated process 720, 721, and 722, which have been calibrated on the reference machine 730 in order to estimate the computing capacity of the virtual machines. The computer calibrated process may for example be retrieved from of a database, to which the scheduler has access, for example according to the computing loads of the process, or the type of task performed by the process.

In a number of embodiments of the invention the scheduler runs the process 500 on each new virtual machine, in order to know permanently the computing capacity of each available machine.

In a number of embodiments of the invention, scheduler 700 stores the computing capacity of each machine, and the sum of the computing loads of the processes running on it. For each new process to execute, the scheduler computes the corresponding computing load, and runs the process on one of the available virtual machines according to the computing load of the new process to execute, and the available computing capacity of each machine.

The computing load of the new process to execute can for example be calculated by running a number of instances of the new process on the reference machine 730, until it is not able to execute successfully. U.S. patent application Ser. No. 15/261,946, entitled "Dispatching the Processing of a Computer Process Amongst a Plurality of Virtual Machines," filed Sep. 10, 2016, discloses a number of methods for dispatching processes amongst Virtual Machines.

Hardware Mechanisms

Figure 8:
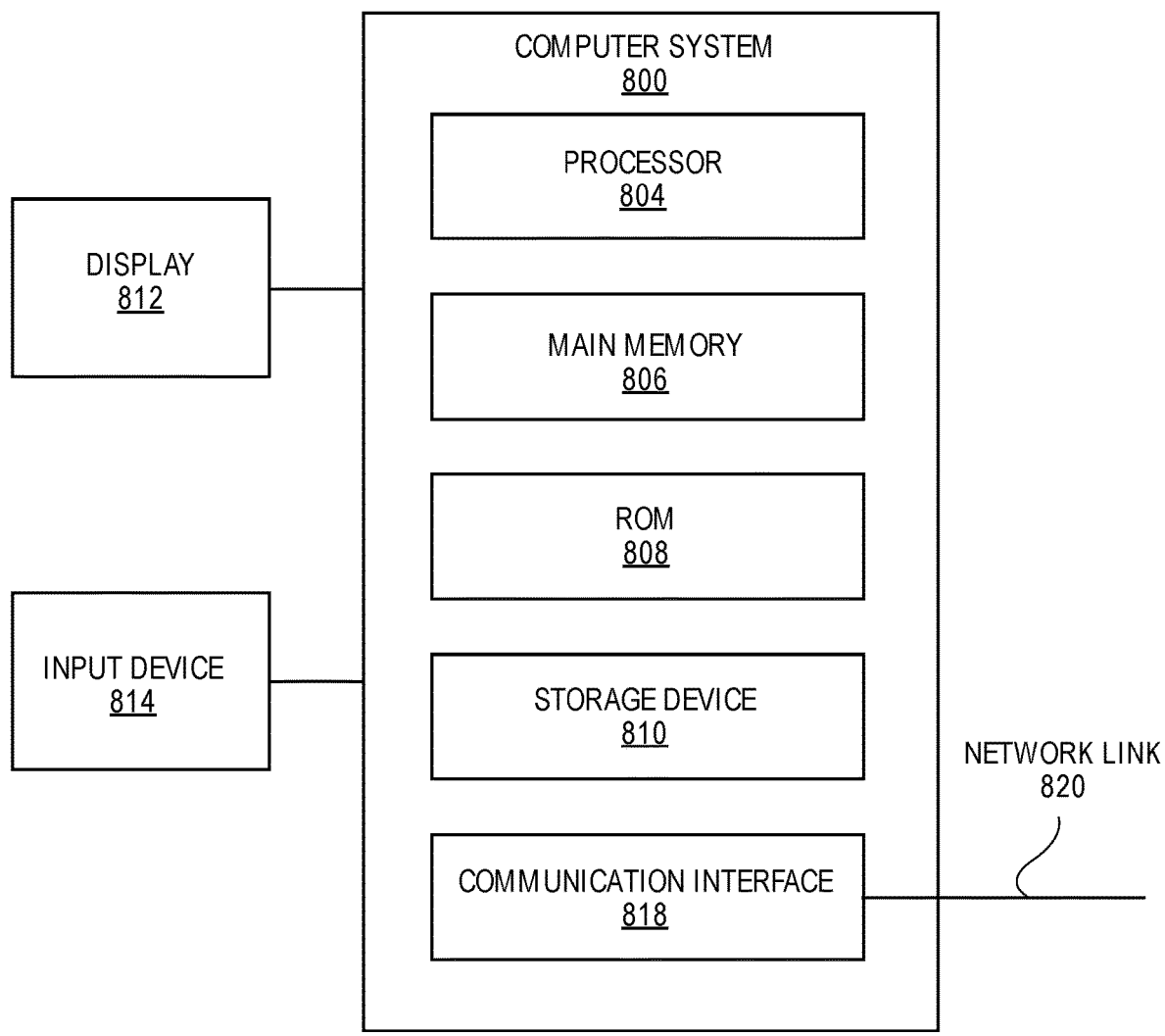
FIG. 8 is a block diagram that illustrates a computer system upon which an embodiment of the invention may be implemented.

In an embodiment, digital video encoder 210 of FIG. 2 may be implemented on a computer system. FIG. 8 is a block diagram that illustrates a computer system 800 upon which an embodiment of the invention may be implemented. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random-access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Computer system 800 may be coupled to a display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 8, embodiments of the invention may include any number of input devices 814 coupled to computer system 800.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for dynamically allocating CPU cycles for use in processing a video stream, which when executed by one or more processors, causes:

upon the occurrence of each periodic interval in a series of periodic intervals, performing: (a) determining video complexity information, for two or more digital video streams that are each actively being processed by a separate encoding module of a single video encoder, associated with one or more future intervals in said series of periodic intervals; and (b) determining whether an amount of CPU cycles allocated to processing a particular digital video stream of the two or more digital video streams should be adjusted in a particular future interval in said series of periodic intervals based on: (i) a dynamically assessed impact on video quality in said two or more digital video streams after being encoded by said single video encoder after adjusting the amount of CPU cycles allocated to one or more separate encoding modules of said single video encoder, (ii) the determined video complexity information for the two or more digital video streams during said particular future interval, and (iii) assigned capabilities of a virtual machine in which the particular digital video stream is being processed, wherein each encoding module of said single video encoder is implemented solely in software and not in hardware, wherein said single video encoder comprises a number of physical CPUs, and wherein each encoding module is allocated to use a certain allotment of CPU cycles, of the number of physical CPUs, in each periodic interval of said series of periodic intervals.

2. The non-transitory computer-readable storage medium of claim 1, wherein each periodic interval in the series of periodic intervals corresponds to one or more frames of digital video in the particular video stream.

3. The non-transitory computer-readable storage medium of claim 1, wherein each periodic interval in the series of periodic intervals corresponds to a period of time or a certain number of CPU clock cycles.

4. The non-transitory computer-readable storage medium of claim 1, wherein the determined video complexity information describes the complexity of digital video carried by the two or more digital video streams across a bounded number of consecutive digital frames, wherein said bounded number of consecutive digital frames includes digital frames not yet processed by said single video encoder.

5. The non-transitory computer-readable storage medium of claim 1, wherein the execution of the one or more sequences of instructions further causes:
causing the particular digital video stream to be processed within a new virtual machine having a different amount of CPU cycles allocated thereto than said virtual machine.

6. The non-transitory computer-readable storage medium of claim 1, wherein the execution of the one or more sequences of instructions further causes:
dynamically adjusting the amount of CPU cycles allocated to said virtual machine processing the particular digital video stream.

7. The non-transitory computer-readable storage medium of claim 1, wherein the execution of the one or more sequences of instructions further causes:
dynamically adjusting the amount of CPU cycles allocated to processing the particular digital video stream by maximizing a measure of optimal video quality calculated for the two or more digital video streams using, at least in part, the determined video complexity information.

8. The non-transitory computer-readable storage medium of claim 7, wherein
maximizing the measure of optimal video quality for the two or more digital video streams comprises:
identifying one or more features in at least one of the two or more digital video streams in which support for will be reduced or ceased during said periodic interval.

9. The non-transitory computer-readable storage medium of claim 7, wherein
the measure of optimal video quality for the two or more digital video streams is determined by assessing the video quality of at least one of the two or more digital video streams at a greater importance than another digital video stream in the two or more digital video streams.

10. A non-transitory computer-readable storage medium storing one or more sequences of instructions for dynamically allocating CPU cycles for use in processing a video stream, which when executed by one or more processors, causes:
upon the occurrence of each periodic interval in a series of periodic intervals, performing: (a) determining video complexity information for two or more digital video streams actively being processed by a single video encoder; and (b) determining whether an amount of CPU cycles processing a particular digital video stream of the two or more digital video streams should be adjusted based on the determining video complexity information and assigned capabilities of a virtual machine in which the particular digital video stream is being processed; and
dynamically increasing the amount of CPU cycles allocated to the virtual machine based on, at least in part, the determined video complexity information, wherein dynamically increasing comprising:
assessing a first impact of decreasing the amount of CPU cycles allocated to the virtual machine processing at least one digital video stream of the two or more digital video streams, and
assessing a second impact of increasing the amount of CPU cycles allocated to the virtual machine processing the particular digital video stream proportional to a total amount of CPU cycles reduced from said at least one digital video stream.

11. An apparatus for dynamically allocating CPU cycles for use in processing a video stream, comprising:
one or more processors; and
one or more non-transitory, machine-readable storage mediums storing one or more sequences of instructions, which when executed, cause:
upon the occurrence of each periodic interval in a series of periodic intervals, performing: (a) determining video complexity information, for two or more digital video streams that are each actively being processed by a separate encoding module of a single video encoder, associated with one or more future intervals in said series of periodic intervals; and (b) determining whether an amount of CPU cycles allocated to processing a particular digital video stream of the two or more digital video streams should be adjusted in a particular future interval in said series of periodic intervals based on (i) a dynamically assessed impact on video quality in said two or more digital video streams after being encoded by said single video encoder after adjusting the amount of CPU cycles allocated to one or more separate encoding modules of said single video encoder, (ii) the determined video complexity information for the two or more digital video streams during said particular future interval, and (iii) assigned capabilities of a virtual machine in which the particular digital video stream is being processed,
wherein each encoding module of said single video encoder is implemented solely in software and not in hardware, wherein said single video encoder comprises a number of physical CPUs, and wherein each encoding module is allocated to use a certain allotment of CPU cycles, of the number of physical CPUs, in each periodic interval of said series of periodic intervals.

12. The apparatus of claim 11, wherein the determined video complexity information describes the complexity of digital video carried by the two or more digital video streams across a bounded number of consecutive digital frames, wherein said bounded number of consecutive digital frames includes digital frames not yet processed by said single video encoder.

13. The apparatus of claim 11, wherein the execution of the one or more sequences of instructions further causes:
causing the particular digital video stream to be processed within a new virtual machine having a different amount of CPU cycles allocated thereto than said virtual machine.

14. The apparatus of claim 11, wherein the execution of the one or more sequences of instructions further causes:
dynamically adjusting the amount of CPU cycles allocated to said virtual machine processing the particular digital video stream.

15. The apparatus of claim 11, wherein the execution of the one or more sequences of instructions further causes:
dynamically adjusting the amount of CPU cycles allocated to processing the particular digital video stream by maximizing a measure of optimal video quality calculated for the two or more digital video streams using, at least in part, the determined video complexity information.

16. The apparatus of claim 15, wherein
maximizing the measure of optimal video quality for the two or more digital video streams comprises:
identifying one or more features in at least one of the two or more digital video streams in which support for will be reduced or ceased during said periodic interval.

17. The apparatus of claim 15, wherein
the measure of optimal video quality for the two or more digital video streams is determined by assessing the video quality of at least one of the two or more digital video streams at a greater importance than another digital video stream in the two or more digital video streams.

18. An apparatus for dynamically allocating CPU cycles for use in processing a video stream, comprising:
one or more processors; and
one or more non-transitory, machine-readable storage mediums storing one or more sequences of instructions, which when executed, cause:
upon the occurrence of each periodic interval in a series of periodic intervals, performing: (a) determining video complexity information for two or more digital video streams actively being processed by a single video encoder; and (b) determining whether an amount of CPU cycles processing a particular digital video stream of the two or more digital video streams should be adjusted based on the determining video complexity information and assigned capabilities of a virtual machine in which the particular digital video stream is being processed; and
dynamically increasing the amount of CPU cycles allocated to the virtual machine based on, at least in part, the determined video complexity information, wherein dynamically increasing comprising:
assessing a first impact of decreasing the amount of CPU cycles allocated to the virtual machine processing at least one digital video stream of the two or more digital video streams, and;
assessing a second impact of increasing the amount of CPU cycles allocated to the virtual machine processing the particular digital video stream proportional to a total amount of CPU cycles reduced from said at least one digital video stream.

19. A non-transitory computer-readable storage medium storing one or more sequences of instructions for dynamically allocating CPU cycles for use in processing a video stream, which when executed by one or more processors, causes:
executing on a physical machine a number of calibrated computer processes, each of the calibrated computer processes having a calibrated computing load defined by one or more of a CPU load, a memory load, and a bandwidth load;
checking if an output of a computing machine matches or is better than a performance threshold defined by one or more of a quality parameter of the output and a latency parameter between an input into the computing machine and an output from the computing machine, wherein the computing machine is the physical machine or a virtual machine;
iteratively adding or removing a calibrated computer process until a stop criterion defined by a required level of precision is achieved;
calculating the computing capacity of the computing machine as the sum of the calibrated computer loads of the calibrated computer processes running on the computing machine when the stop criterion is achieved; and
after processing a digital video stream in said computing machine, adjusting an amount of CPU cycles processing the digital video stream based on video complexity information determined for the digital video stream and the calculated computing capacity of the computing machine.

20. The non-transitory computer-readable storage medium of claim 19, wherein said adjusting an amount of CPU cycles processing the digital video stream comprises:
dynamically adjusting the number of CPU cycles assigned to said virtual machine or by processing the digital video stream in a different virtual machine allocated to a different amount of CPU cycles.

* * * * *